(12) United States Patent
Holmes et al.

(10) Patent No.: US 10,131,069 B2
(45) Date of Patent: Nov. 20, 2018

(54) HAND-HELD SLICER (71) Applicant: Progressive International Corporation, Kent, WA (US)

(72) Inventors: Larry Holmes, Covington, WA (US); Sascha Kaposi, Tacoma, WA (US)

(73) Assignee: PROGRESSIVE INTERNATIONAL CORPORATION, Kent, WA (US)

( * ) Notice: Subject to any disclaimer, the term of this patent is extended or adjusted under 35 U.S.C. 154(b) by 90 days.

(21) Appl. No.: 15/012,216

(22) Filed: Feb. 1, 2016

(65) Prior Publication Data

US 2016/0144524 A1 May 26, 2016

Related U.S. Application Data (60) Division of application No. 13/872,924, filed on Apr. 29, 2013, which is a continuation of application No. 12/544,103, filed on Aug. 19, 2009, now Pat. No. 8,430,010.

(60) Provisional application No. 61/116,099, filed on Nov. 19, 2008.

(51) Int. Cl.
| | |
|---|---|
| *B27B 5/02* | (2006.01) |
| *B27B 5/18* | (2006.01) |
| *B27B 29/02* | (2006.01) |
| *B26D 1/02* | (2006.01) |
| *B26D 3/28* | (2006.01) |
| *A47J 43/25* | (2006.01) |
| *B26D 5/02* | (2006.01) |

(52) U.S. Cl.
CPC .............. *B26D 3/283* (2013.01); *A47J 43/25* (2013.01); *B26D 5/02* (2013.01); *B26D 2003/286* (2013.01); *B26D 2003/288* (2013.01); *Y10T 83/6492* (2015.04); *Y10T 83/9493* (2015.04)

(58) Field of Classification Search
CPC .... B26D 3/283; B26D 5/02; B26D 2003/288; B26D 2003/286; Y10T 83/6492; Y10T 83/9493; A47J 43/25
USPC ............... 83/856, 703–709; 30/113.1, 123.5, 30/279.6, 289; 99/537–538
See application file for complete search history.

(56) References Cited

U.S. PATENT DOCUMENTS

| | | | | |
|---|---|---|---|---|
| 1,981,451 | A * | 11/1934 | Herrington | B26D 1/25 30/287 |
| 2,286,177 | A * | 6/1942 | Fabian | B26D 3/283 83/699.61 |
| 4,570,519 | A * | 2/1986 | Motosko, II | B26B 5/007 30/283 |

(Continued)

FOREIGN PATENT DOCUMENTS

EP 1537962 A1 * 6/2005 ............ B26D 3/283

*Primary Examiner* — Ghassem Alie
*Assistant Examiner* — Bharat C Patel
(74) *Attorney, Agent, or Firm* — Lowe Graham Jones PLLC (57) ABSTRACT

A hand-held slicing device having a handle connected to a slicing tray. The slicing tray includes a ramp leading to a fixed blade. The ramp is readily adjustable such that the height of the edge of the ramp most closely adjacent the blade can be raised or lowered. In one version, the ramp can be raised or lowered by sliding a support structure connected to a knob that can be slideably adjusted by the user's thumb. The device may include a series of julienne blades that are selectively extendable above the slicing ramp or retractable below the ramp.

10 Claims, 4 Drawing Sheets

(56) References Cited

U.S. PATENT DOCUMENTS

| | | | | |
|---|---|---|---|---|
| 6,082,645 A * | 7/2000 | Himmighofen | ........ | B26D 3/283 241/168 |
| 8,181,560 B2 * | 5/2012 | Hauser | .................. | B26D 3/283 30/283 |
| 2010/0122465 A1 * | 5/2010 | Holmes | .................. | A47J 43/25 30/275.4 |
| 2010/0263514 A1 * | 10/2010 | Mah | ....................... | B26D 3/283 83/856 |

* cited by examiner

HAND-HELD SLICER

PRIORITY CLAIM

This application is a divisional of U.S. application Ser. No. 13/872,924, filed Apr. 29, 2013, which is a continuation of U.S. application Ser. No. 12/544,103 filed Aug. 19, 2009, which claims priority to U.S. Provisional Application No. 61/116,099 filed Nov. 19, 2008, the contents of each of the foregoing are incorporated by reference.

FIELD OF THE INVENTION

This invention relates generally to slicing devices, particularly including hand-held mandoline-type slicing devices.

BACKGROUND OF THE INVENTION

There are a variety of slicing devices currently available, including slicers of the mandoline type. Many of the hand-held slicers have no ability to adjust the thickness of the slices that can be made, while those that are adjustable have adjustment mechanisms that are awkward or inconvenient to use.

SUMMARY OF THE INVENTION

In a preferred version, the invention comprises a hand-held slicing device having a handle connected to a slicing tray. The slicing tray includes a ramp leading to a fixed blade. The ramp is readily adjustable such that the height of the edge of the ramp most closely adjacent the blade can be raised or lowered. In one version, the ramp can be raised or lowered by sliding a support structure connected to a knob. Most preferably, the knob is positioned adjacent the handle so that it can be slideably adjusted by the user's thumb.

An alternate version includes a series of julienne blades that are selectively extendable above the slicing ramp or retractable below the ramp. In the extended position, a food item is separated into strips as it is sliced, thereby producing individual strips while slicing.

DETAILED DESCRIPTION OF THE PREFERRED EMBODIMENT

The preferred version of the slicer includes a slicing tray 10 having a handle 20 at one end. The slicing tray has a distal end 12 opposite the handle and a proximal end 14 adjacent the handle. A blade 16 is secured to the distal end of the tray and, in the preferred version as shown extends angularly across the tray. The blade as shown includes a series of holes for receiving pegs extending upward from the tray to affix the blade to the tray.

The two opposing sides of the tray each include an upwardly extending flange forming a guide 17, 18 for retaining a hand guard or the food item to be sliced. The guide extends above the top, or upper, surface 130 of the tray (see FIG. 2) on either side of the tray, and may extend below the lower surface 132 of the tray (see FIG. 3) and forms a frame for carrying the brace, julienne blade bar, and cam as further described below. The tray may optionally include a plurality of longitudinal ribs substantially parallel with the guides and spaced apart along the tray to facilitate sliding motion of a food item along the tray. In an exemplary version the tray is formed integrally from clear plastic, though metals or other materials may also be used.

Figure 1:
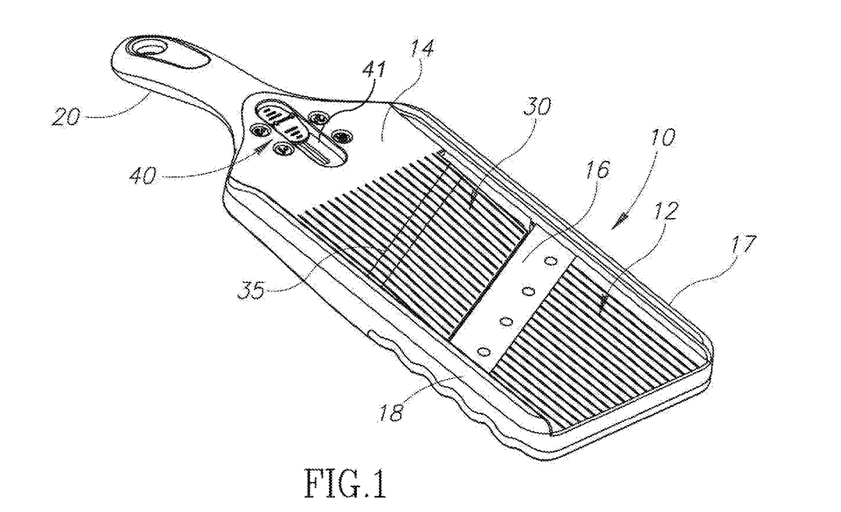
FIG. 1 is a perspective view of a preferred hand-held slicer.
Figure 2:
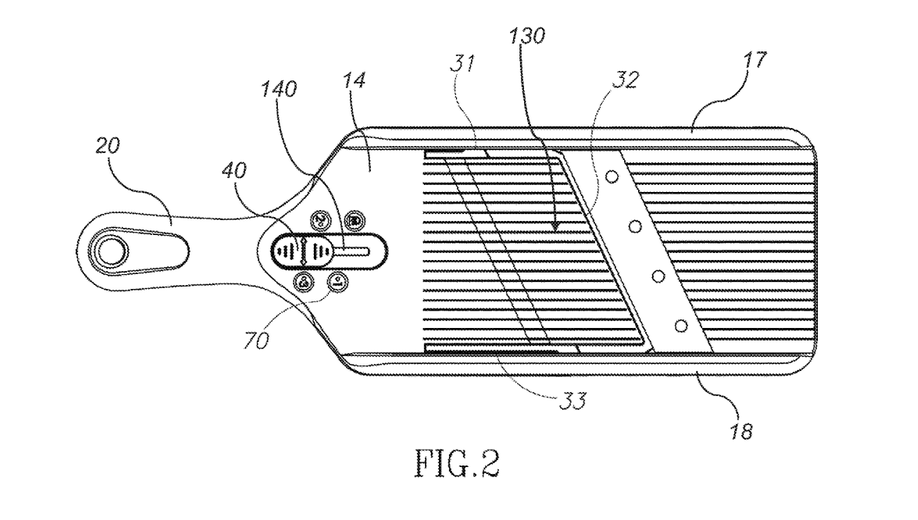
FIG. 2 is a top view of the hand-held slicer of FIG. 1.
Figure 3:
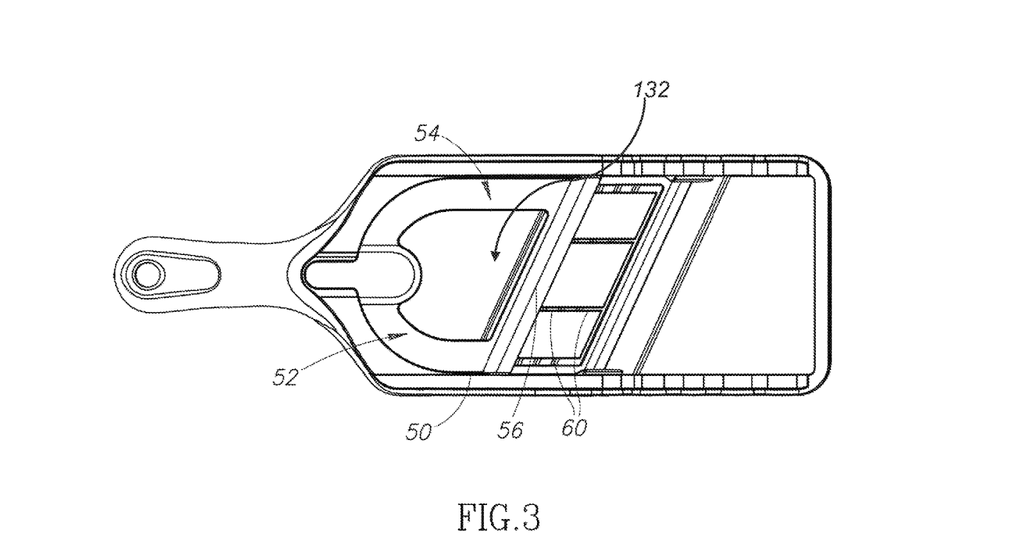
FIG. 3 is a bottom view of the hand-held slicer of FIG. 1.
Figure 4:
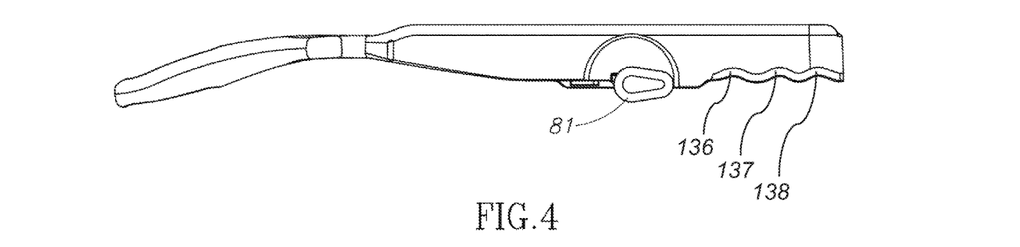
FIG. 4 is a side view of an alternate slicer which incorporates julienne blades.
Figure 5:
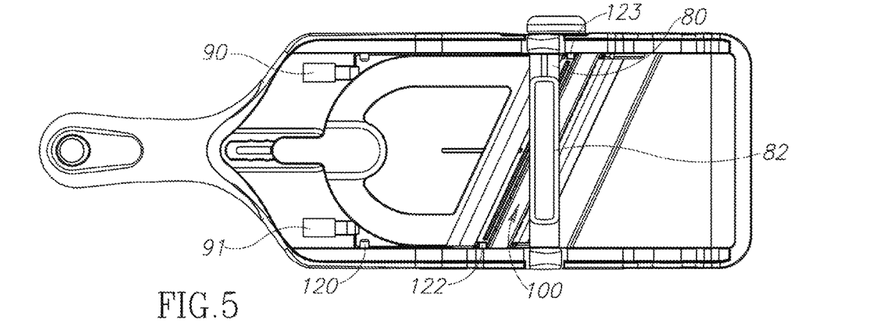
FIG. 5 is a bottom view of the slicer of FIG. 4.

A ramp 30 is formed in the proximal end 14 of the tray 10. The ramp is created by a channel formed in the tray that provides a gap between the ramp and each of the opposing guides and the distal end of the tray. Thus, the channel has three sections, including a first section 31 running along one of the guides, a second section 32 adjacent the length of the blade, and a third section 33 running along the other of the two guides. In the version as illustrated in FIGS. 1-3, the tray, including the ramp, is integrally formed with the channel being created as part of the molding process. In other versions, such as shown in FIGS. 5-8, the ramp may be created separately and secured to one or more of the guides, handle, and distal end of the tray.

The ramp is further formed during the molding process (or otherwise affixed as described below) such that the distal end of the ramp (that is, the end most closely adjacent the blade) is naturally biased in a position below the blade. Accordingly, at its lowest position with respect to the blade, the position of the ramp provides a gap (corresponding to the second section channel 32) defining the largest slices expected to be created with the slicer. As discussed further below, the ramp is adjustable to move the distal end of the ramp upward to a position closer to the plane of the distal end of the tray.

In versions in which the ramp is integrally formed with the tray, a groove 35 is formed on the bottom surface of the ramp to decrease the strength of the ramp along the groove. Accordingly, the groove acts as a living hinge, thereby allowing the ramp to more readily bend along the groove. Preferably the groove follows a path that is parallel to lines defined by the end of the ramp and the cutting edge of the blade so that the ramp will be raised or lowered uniformly with respect to the blade.

An adjustment knob 40 is provided in a position adjacent the handle, and preferably close enough to the handle such that a user can trigger the adjustment knob while holding the slicer by the handle. As illustrated in FIGS. 1 and 2, for example, the knob 40 is located at a proximal end 14 of the tray 10, at a location that forms a juncture where the handle 20 meets the proximal end 14 of the tray 10. The adjustment knob as shown is positioned on the tray 10 and recessed in a trough 41 below the top surface of the proximal end 14 of the tray 10 so that it is less likely to be inadvertently moved. As seen in the sectional view of FIG. 7, the top of the knob 40 extends to a height that does not extend above the plane defined by the top of the tray 10 (which is coplanar with the proximal end 14 and distal end 12 of the tray). As shown, the knob 40 is in an elongated form having a central raised portion so that it can be readily moved in a sliding fashion in a first direction by pushing against the raised portion and then moved in an opposite second direction by pulling against the raised portion.

Figure 6:
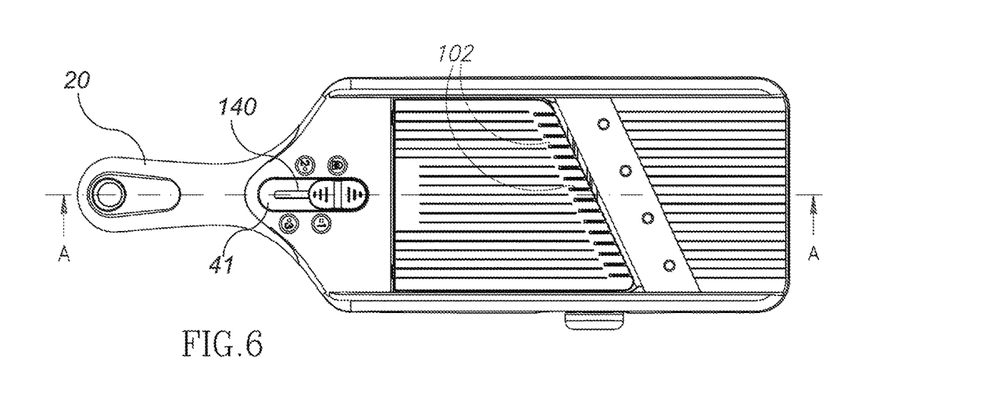
FIG. 6 is a top view of the slicer of FIG. 4.
Figure 7:
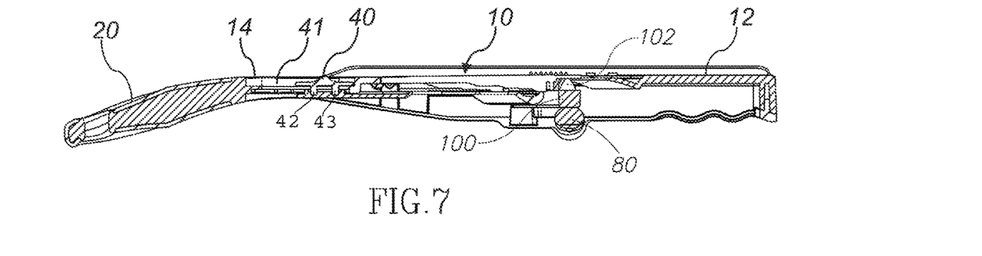
FIG. 7 is a sectional view taken along line A-A in FIG. 6.
Figure 8:
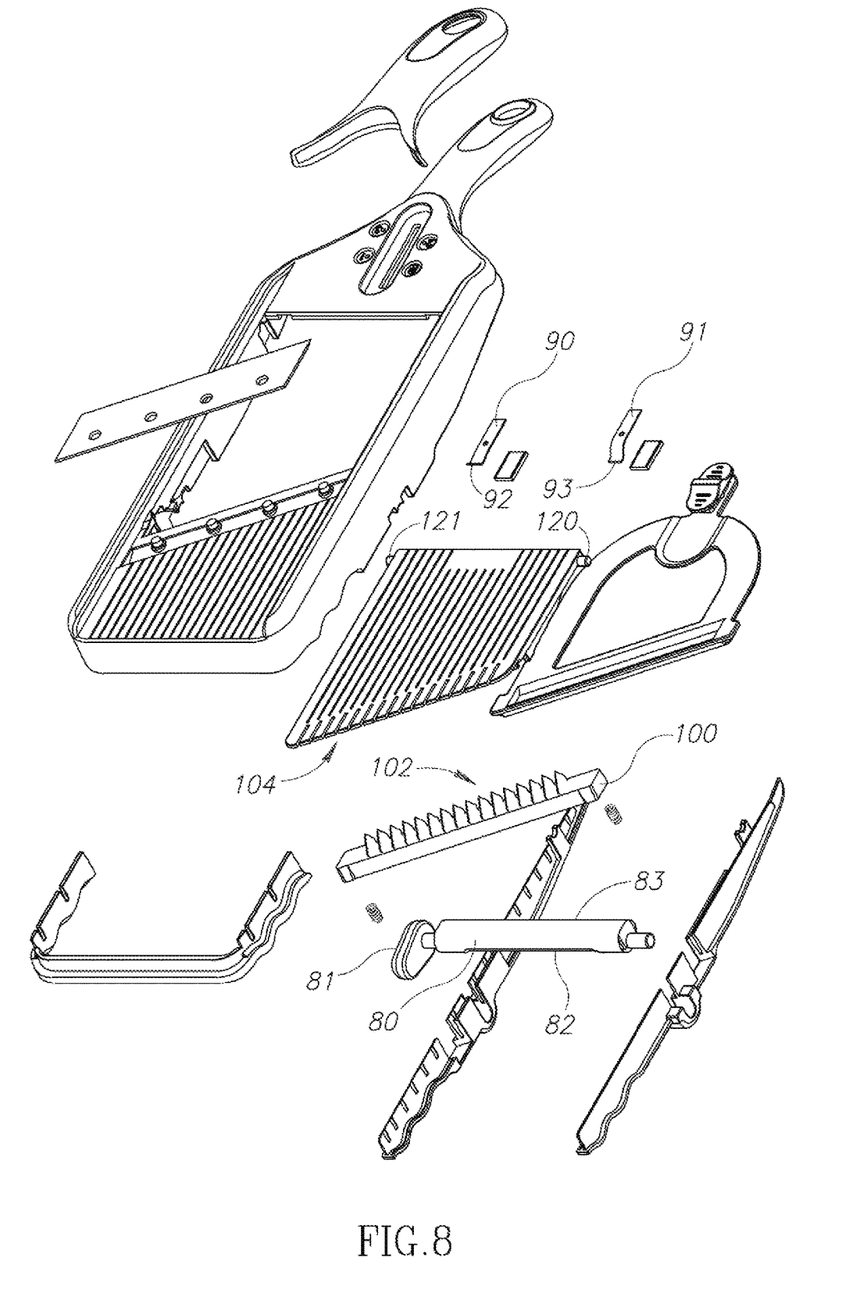
FIG. 8 is an exploded view of the slicer of FIG. 4.

A lower portion of the knob includes a stem 42, 43 that is received within a longitudinal slot 140 positioned within the trough 41, thereby allowing the knob to move longitudinally back and forth within the slot. The longitudinal slot 140 and trough 41 are generally axially aligned with and adjacent to the handle when viewed from the top (see, e.g., FIG. 6, illustrating the slot 140, trough 41, and handle 20 extending along line A-A), and therefore in the illustrated version the handle and the slot are formed along a common axis that extends through the center of the tray between the first guide and the second guide, and transverse to the blade. The stem 42, 43 connects to a brace 50 provided on the opposite side of the ramp, such that longitudinal movement of the knob causes corresponding longitudinal movement of the brace.

The brace is formed as an uneven U shape in which one side upright 54 of the U is longer than the other 52, with a cross-member 56 extending between the uprights. The cross-member is substantially straight and parallel to both the end of the ramp and the blade, though in other versions it may be otherwise configured. Each side of the upright includes a lateral tab that is received within a corresponding slot formed in the guides 17, 18 to retain the cross-member (and therefore the brace) against the bottom of the proximal end of the tray.

The bottom surface of the distal end of the ramp includes an incline, which in this case is formed with one or more steps 60. The steps are formed in a wall extending downwardly and generally orthogonal to the plane defined by the ramp. The height of the wall at a first step is relatively short and preferably about 1/16 to 1/8 inches in height. Additional steps may be provided as the wall moves in a direction from the proximal end toward the distal end of the ramp, with the steps defining progressive increases in wall height. Preferably the steps include increments of about 1/16 of an inch from one step to the next, and preferably there are four or more steps. Though one wall having a series of steps is described, the slicer may have multiple walls arranged parallel to one another for greater support. In an example version, the lower surface includes four walls having four steps each, with the four walls being uniformly spaced along the cross-member and angularly offset in a manner parallel with the cross-member. Though the incline is formed with steps in the version as illustrated, in other versions the incline may have a smooth surface with no steps. Likewise, though the incline is formed on the bottom of the ramp in the version as shown, in other versions the incline may be formed on the support and mate with a corresponding engagement surface formed on the bottom of the ramp.

The cross-member 56 is configured to engage the steps 60 formed in the wall. As the knob is urged from the proximal end of the ramp toward the distal end of the ramp, it causes the brace to travel in the same direction and therefore the cross-member to encounter steps of increasing height. Because the brace is held at a fixed vertical position by virtue of the tabs and corresponding slots in the guides, when the brace engages a step of increased height it causes the ramp to move farther away from the brace. This stepwise movement of the ramp causes the ramp to move into a plane that is increasingly closer to the same plane as that of the distal end of the tray.

When the knob 40 is at a first position most closely adjacent the handle, the ramp is at its lowest position with respect to the tray and therefore an item that is sliced will be relatively thick. The actual thickness will be defined by the design process, as a function of the bend in the ramp, the construction of the brace and steps, and the plane of the tray. Each successive movement of the knob that forces the cross-member onto a higher step causes the ramp to move higher, thereby reducing the size of the gap between the ramp and the blade and forming thinner slices. In the version as shown, the most distant position of the knob pushes the cross-member into engagement with a step that raises the ramp to a position that is even with or slightly higher than the plane defined by the blade. This final position is useful for storage or for locking the device into a safe position in which the user is unlikely to be accidentally cut by an exposed blade.

Along the sides of the trough 41 retaining the knob, one or more markings 70 is provided to indicate to the user the corresponding step or height of the ramp. The markings may indicate different step numbers in an incremental fashion (e.g., 1, 2, 3, etc.), or may indicate actual thicknesses of the gap between the ramp and the blade, and therefore the thickness of the corresponding slice (e.g., 1/16", 1/8", etc.). A final marking may include an icon such as a padlock or other symbol to indicate the position to be used for storage or safety.

The lower side of the distal end of the tray preferably includes a non-skid surface. As shown, the lower surface includes one or more scallops or undulating surfaces 136, 137, 138 that allows the slicer to be readily secured to the rim of a bowl or the like in order to slice food items into a bowl. In a preferred example, the lower perimeter of the distal end of the ramp is formed from an elastomeric or other non-skid material.

A hand guard is optionally provided to allow food items to be sliced while keeping the hand of the user safely out of the path of the blade. In the preferred version, the hand guard includes an upper grip on a top surface and a plurality of downwardly depending spikes configured to engage a food item so that it can be used to move the food item back and forth across the tray. The hand guard may include optional peripheral flanges sized and configured to be received within the sides of the guards to facilitate even, longitudinal movement of the guard along the tray.

Some versions of the invention further include a julienne slicing feature, as shown in FIGS. 4-8. In such a version, the edge of the ramp 30 adjacent the blade 16 is formed with a series of slots 104. As shown, the slots are evenly spaced along the entire edge of the ramp. In one version, the ramp includes sixteen slots spaced approximately inch apart and having a depth of about inch. In other versions, the slots may be spaced closer together or farther apart (to create thinner or thicker sliced strips, as discussed below), and may have a larger or smaller depth, as desired. Likewise, the slots may extend only along a portion of the edge of the ramp.

A series of julienne blades 102 is provided and attached to the slicing device such that a blade is positioned beneath each of the slots 104. The blades are secured to the device in a manner that allows them to selectively retract below the top surface of the ramp or to enable each one of the blades to extend through a corresponding one of the slots in the ramp, as desired.

In a preferred implementation, the blades 102 are secured to a bar 100, with the plurality of blades being spaced apart along the bar 100 in a manner that corresponds to the size and spacing of the slots 104. The bar is generally rectangular in cross section. Each of the blades includes a sharpened, angled edge facing toward the handle. The bar includes a first end and a second end, with each of the first and second ends being received channels formed in opposing sidewalls of the slicer beneath the guides 17, 18. A spring is provided adjacent each of the first and second ends between the bar 100 and a surface of the device adjacent an upper portion of the ramp, with the springs being configured to urge the bar 100 in a downward position, away from the ramp. In the lowest downward position the bar is sufficiently low that the blades are fully retracted beneath the ramp.

The bar 100 includes an upper surface from which the blades 102 extend and an opposing lower surface. The lower surface rests against a cam 80 that is pivotally secured to the slicer. The cam includes a handle 81 pivotally attached to the cam along a central axis of the cam. The cam further includes a first outer surface 82 and a second outer surface 83, the first outer surface being radially closer to the central axis while the second outer surface is radially farther out from the central axis. The cam is pivotally secured within the slicer such that the bar 100 rests against the cam, with the bar being pushed toward the cam by the springs. When the cam is rotated such that the bar rests against the first outer surface, the bar is relatively more distant from the ramp. When the cam is rotated such that the bar rests against the second outer surface, the bar is pushed upward, toward the ramp, because of the greater radial distance of the second outer surface. In this cam position, the bar and its accompanying blades are pushed upward so that the blades extend through the slots formed in the ramp, thereby allowing the slicer to be used to make strips of a food item being pushed through the slicer.

In alternate versions of the invention, structures other than a cam may be used. Thus, for example, the bar may be movable via a dial, screws, a series of notches in the frame, or other such structures.

In the version of FIGS. 5-8, the ramp is formed separately from the slicer and held in place by a pair of resilient leaf springs or the like. Thus, a pair of springs 90, 91 are secured to the slicer adjacent the handle. The ramp 30 includes a pair of pins 120, 121 extending laterally outward at the end of the ramp opposite the slots. The pins are received within corresponding holes formed in the sidewalls of the slicer to pivotally secure the ramp to the slicer. A pair of tabs 122, 123 is provided in positions extending laterally from the guides just below the ramp, with one tab located on each of the opposite sides of the ramp adjacent the grooves. The tabs provide support for the distal end of the ramp, ensuring that it does not pivot downward below the level of the blade any farther than a desired distance.

The ramp is pivotally secured to the tray along a pivot axis extending through the pins 120, 121. Preferably, the pivot axis and the handle are each located adjacent the proximal end of the tray, and the pivot axis is generally orthogonal to an axis defined by the handle. The blade and the distal end of the ramp each form an angle that is non-parallel with the pivot axis.

In the version as shown, the springs 90, 91 include distal ends 92, 93 that are curved. The curved distal ends of the springs engage corresponding elongated and rounded bearing surfaces extending below the ramp. The bearing surfaces are shaped such that upward pivotal movement of the ramp pushes the spring downward, increasing the urging force of the spring against the ramp in order to urge the ramp back into a downward-pivoted position.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims.

We claim:

1. A slicing device, comprising:
 a tray defining a plane and having a proximal end and a distal end, an upper surface and a lower surface, the proximal end of the tray having a ramp, the ramp being pivotable through a range of motion including a first position in which the ramp lies substantially within the plane defined by the tray and a second position in which the ramp is pivoted below the upper surface of the tray;
 a guide extending above the upper surface of the tray and having a first side and a second side, the tray being positioned between the first side and the second side of the guide, and further wherein a central tray axis extends between the first side and the second side of the blade, the tray axis further extending between the proximal end and the distal end of the tray,
 a blade secured to the distal end of the tray and positioned between the first side and the second side of the guide;
 a slot formed in the tray and defining a linear path along the tray axis;
 a brace engaged with the ramp, the brace having a moveable engagement surface for contacting the ramp, whereby movement of the brace causes pivotal movement of the ramp;
 a knob positioned on the tray and connected to the brace, the knob being slideably moveable along a path defined by the slot; and
 an elongated handle secured to and extending away from the proximal end of the tray in a direction defined by the tray axis.

2. The slicing device of claim 1, further comprising a trough formed in the upper surface of the tray, the slot being positioned within the trough, the knob being slideably moveable within the trough.

3. The slicing device of claim 2, wherein the knob is recessed within the trough and below the upper surface of the tray.

4. The slicing device of claim 3, wherein the knob is positioned at a juncture where the handle joins to the upper surface of the tray.

5. The slicing device of claim 4, wherein the knob is slideably moveable along a path parallel to the plane defined by the tray.

6. A slicing device, comprising:
 a tray having a proximal end and a distal end, an upper surface defining a plane, and a lower surface;
 a guide having a first side and a second side, the tray being positioned between the first side and the second side of the guide;
 a ramp forming a portion of the tray, the ramp having an upper surface and a lower surface, the ramp being pivotally secured to the slicing device adjacent the proximal end of the tray such that the ramp is pivotable through a range of motion including a first position in which the upper surface of the ramp lies substantially within the plane defined by the upper surface of the tray and a second position in which the upper surface of the ramp is pivoted toward the lower surface of the tray;
 a blade secured to the distal end of the tray, the blade being positioned on the distal end of the tray such that the blade is closely adjacent the second end of the ramp when the ramp is in the first position;
 an elongated handle secured to the proximal end of the tray and extending away from the proximal end of the tray along an axis defined centrally between the first side and the second side of the blade, the axis further extending between the proximal end and the distal end of the tray, and transverse to the blade
 a brace engaged with the ramp, at least one of the ramp and the brace having an incline surface and the other of the ramp and the brace having an engagement surface for contacting the incline surface, whereby movement of the brace with respect to the ramp causes the engagement surface to contact a different portion of the incline surface and to pivotally move the ramp;

a longitudinal slot extending through the tray parallel with the axis; and a knob positioned on the upper surface of the tray adjacent the handle and connected to the brace by a stem extending through the longitudinal slot, the knob being slideably moveable along a path defined by the longitudinal slot, the knob further being positioned to be operable by a thumb of a user's hand when the hand is grasping the handle to cause a corresponding movement of the brace.

7. The slicing device of claim 6, further comprising a trough formed in the upper surface of the tray, the longitudinal slot being positioned within the trough, the knob being slideably moveable within the trough.

8. The slicing device of claim 7, wherein the knob is recessed within the trough and below the upper surface of the tray.

9. The slicing device of claim 8, wherein the knob does not extend above the upper surface of the tray.

10. The slicing device of claim 9, wherein the knob is positioned at a juncture where the handle joins to the upper surface of the tray.

* * * * *

UNITED STATES PATENT AND TRADEMARK OFFICE
CERTIFICATE OF CORRECTION

PATENT NO. : 10,131,069 B2
APPLICATION NO. : 15/012216
DATED : November 20, 2018
INVENTOR(S) : Larry Hoilmes and Sascha Kaposi It is certified that error appears in the above-identified patent and that said Letters Patent is hereby corrected as shown below:

In the Claims

In Column 6, Line 11 (Claim 1), "blade" should be --guide--.

In Column 6, Lines 34-36 (Claim 4), "is positioned at a juncture where the handle joins to the upper surface of the tray" should be --does not extend above the upper surface of the tray--.

In Column 6, Lines 38-39 (Claim 5), "slideably moveable along a path parallel to the plane defined by the tray" should be --positioned at a juncture where the handle joins to the upper surface of the tray--.

In Column 6, Line 62 (Claim 6), "blade" should be --guide--.

In Column 7, Lines 22-23 (Claim 9), "does not extend above the upper surface of the tray" should be --is positioned at a juncture where the handle joins to the upper surface of the tray--.

In Column 7, Lines 25-26 (Claim 10), "positioned at a juncture where the handle joins to the upper surface of the tray" should be --slideably moveable along a path parallel to the plane defined by the tray--.

Signed and Sealed this
Eighth Day of January, 2019

Andrei Iancu
*Director of the United States Patent and Trademark Office*